UNITED STATES PATENT OFFICE.

WILLIAM MORRIS, OF PHILADELPHIA, PENNSYLVANIA.

IMPROVEMENT IN PROCESS AND COMPOSITION FOR WATER-PROOFING LEATHER, &c.

Specification forming part of Letters Patent No. 104,629, dated June 21, 1870.

*To all whom it may concern:*

Be it known that I, WILLIAM MORRIS, of the city and county of Philadelphia and State of Pennsylvania, have invented a new Process of Water-Proofing Leather and articles made of leather, textile fabrics, felts and felted manufactures, paper cordage, and twine, &c., and new compositions for effecting the same; and I do hereby declare that the following description of my invention is sufficient to enable those skilled in the art to practice it.

The principle of chemistry (as applied to the arts) on which my invention is founded may be thus stated: If a solution of metallic salts, which have powerful bases, be applied to and caused to combine with the substance of such articles or manufactures, as above named, the effect is to repel moisture and to conserve the strength of the article, and this is due to the presence of the metallic bases and their actual combination with the substance of the goods to which they have been applied.

I am aware that metallic salts have been used in various ways in the arts, by way of seeking to render articles water-proof; but my invention differs from any heretofore known or used, so far as I am aware; and the process consists of two steps or parts, as follows: For the first part I use a chemical compound, which consists of, say, one part of dry gelatine (isinglass or other) dissolved in, say, four parts of oil, including a small quantity of sulphuric or other acid, and when these are combined by means of heat five parts (or thereabout) of an alkaline solution are added, at a specific gravity of about 26° Baumé, the whole being stirred while yet warm, and the result is a chemical combination, which I designate my "Preparatory Compound." For the second part of my process I use a chemical compound, which I designate my "Perfecting Compound," and which is prepared as follows, namely: In one vessel I prepare a strong solution of one of the alums—for instance, of the sulphate of alumina with potassa, or with ammonia, or with soda. In another vessel I prepare a solution of the sulphate of zinc, and in a third vessel a solution of the acetate of lead. These solutions are each to be of the same density. When prepared the two sulphate solutions are mixed in the proportions of about five parts of the first-named to one and a half parts of the latter-named, and to these are added about five and a half parts of the acetate-of-lead solution. By the chemical action that ensues sulphate of lead is formed, and when this has subsided the clear liquid is drawn off, and is reduced to the proper density, which is from 1° to 2° Baumé.

The systematic manner in which I conduct my process of treating the material to be water-proofed is substantially as follows: First, a bath is prepared with, say, half an ounce of my preparatory compound dissolved in two gallons of hot water—that is, in about these proportions. This is used when cold. To treat leather I steep it in this bath until indued with its properties, and then drain it, or the preparatory compound may be dissolved to about the consistency of cream, and then applied by hand before the "fulling" or "stuffing." Boots, shoes, and harness are treated before the final finish.

To treat textile fabrics, felts, cordage, twine, and similar or kindred articles I steep them in the bath, as before described, and then drain them well.

To treat paper, I pass it through the bath, or the pulp may be sized with the preparatory compound, and then the paper passed through the bath.

The second part of my process is conducted as follows: When the goods have been removed from the preparatory bath, and are well drained, I steep them in a bath of my perfecting compound, where they remain from eight to twelve hours, and when well drained they are gradually dried, and are then ready for the usual and final finish in the case of leather, textile fabrics, &c. In the treatment of paper some kinds need not be submitted to the action of the preparatory compound, but require only to be immersed for a short time in the bath of the perfecting compound, and then dried and finished.

As above stated, the strength or density of the prefecting compound should be ascertained by a hydrometer, preferably Baumé's, and when, as in some cases, the goods are immersed in such compound a second or third time, the strength of the compound should be kept up the same as it was at the first immersion. To provide for this a stronger solution should be prepared and in readiness, (say, about double strength,) and so much of this reserve solution should, as occasion may require, be added to the perfecting bath as will restore it to its original density, which will always be ascertainable by the hydrometer.

By my process and treatment of articles, as above described, I find that their texture, color, and porousness are not impaired; that textile goods become water-repellent, notwithstanding the interstices or openings between the threads are not filled up; that the articles are improved by the treatment, and are made by it far more resistive to decay.

The whole process is also cheap, and permits the water-proofing of a great variety of articles, whether made up or in the piece, in a simple and economical manner, while it also renders them more durable. It is admirably adapted to water-proofing leather and other hose for conveying water, hats of all kinds, boots, shoes, umbrellas, sails, and awnings, &c.

I claim—

1. The preparatory compound, prepared substantially as hereinbefore described, and for the purposes set forth.

2. The perfecting compound, prepared substantially as hereinbefore described, and for the purposes set forth.

3. The process, hereinabove described, of rendering articles water-proof, both in its distinctive parts and as a whole, as set forth.

WILLIAM MORRIS.

Witnesses:
 JOHN AVIL,
 E. K. ALLISON.